United States Patent [19]
Pase et al.

[11] Patent Number: 5,566,321
[45] Date of Patent: Oct. 15, 1996

[54] METHOD OF MANAGING DISTRIBUTED MEMORY WITHIN A MASSIVELY PARALLEL PROCESSING SYSTEM

[75] Inventors: Douglas M. Pase, Burnsville; Dave Wagner, Apple Valley, both of Minn.

[73] Assignee: Cray Research, Inc., Eagan, Minn.

[21] Appl. No.: 166,293

[22] Filed: Dec. 13, 1993

[51] Int. Cl.⁶ ........................................ G06F 3/00
[52] U.S. Cl. ........................ 395/480; 395/497.04
[58] Field of Search .............................. 395/400, 425, 395/600, 474, 475, 480, 497.04

[56] References Cited

U.S. PATENT DOCUMENTS 3,924,245  12/1975  Eaton et al. ................... 395/421.09
4,445,170   4/1984  Hughes et al. ..................... 395/402

FOREIGN PATENT DOCUMENTS

0572696A1  8/1993  European Pat. Off. .

OTHER PUBLICATIONS

Tom MacDonald, et al. "Addressing in Cray Research's MPP Fortran," *Proceedings, Third Workshop on Compilers for Parallel Computers*, ACPC/TR, Jul., 1992.

Primary Examiner—David K. Moore
Assistant Examiner—Fadi A. Stephan
Attorney, Agent, or Firm—Schwegman, Lundberg, Woessner & Kluth, P.A.

[57] ABSTRACT

A method of managing distributed memory in which a local memory is partitioned into a shared heap segment, a shared stack segment, a private heap segment and a private stack segment. One of the segments starts at a fixed address and grows upward. A second segment starts at a fixed address and grows downward. A third segment starts at a relocatable segment wall and grows downward and a fourth segment starts at a relocatable segment wall and grows upward.

6 Claims, 4 Drawing Sheets

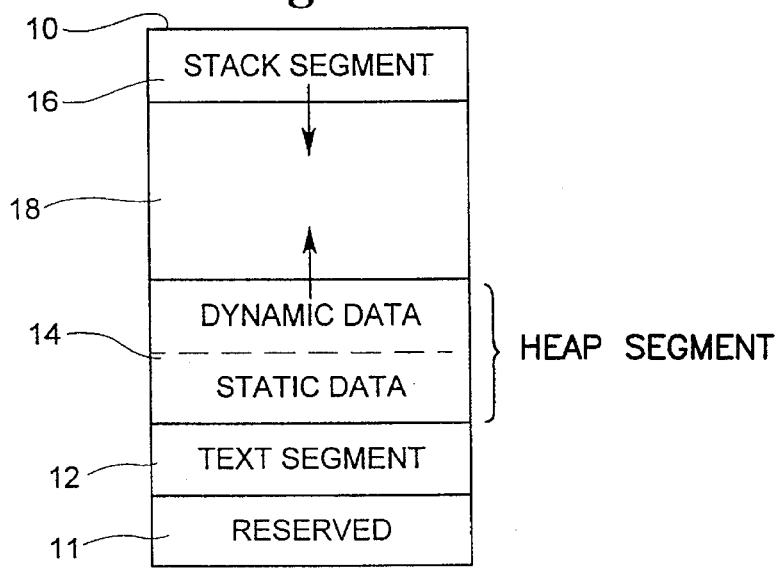
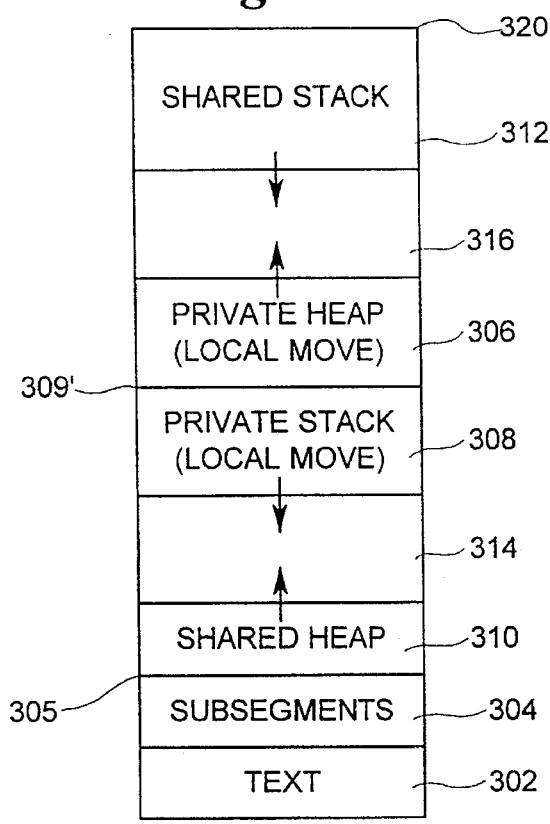
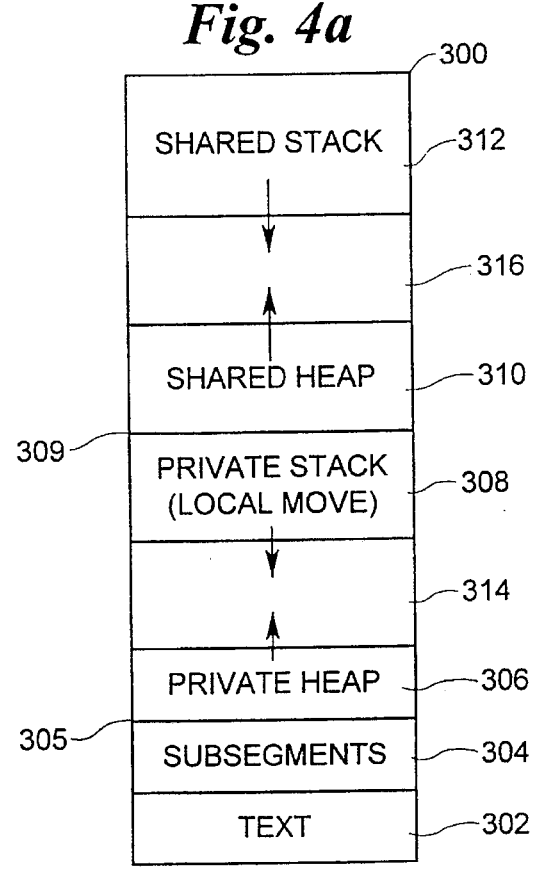

METHOD OF MANAGING DISTRIBUTED MEMORY WITHIN A MASSIVELY PARALLEL PROCESSING SYSTEM

FIELD OF THE INVENTION

The present invention relates generally to massively parallel processing systems, and more particularly to a memory management protocol used to translate a virtual address on one processing element to a physical address into local memory of a second processing element.

BACKGROUND OF THE INVENTION

Massively parallel processing involves the utilization of hundreds or thousands of processing elements (PE's) linked together by high speed interconnect networks. Typically, each PE includes a processor, local memory and an interface circuit connecting the PE to the interconnect network. A distributed memory massively parallel processing (MPP) system, such as that shown in FIG. 1, is one wherein each processor has a favored low latency, high bandwidth path to one or more local memory banks, and a longer latency, lower bandwidth access over the interconnect network to memory banks associated with other processing elements (remote or global memory). In globally addressed distributed memory systems, all memory is directly addressable by any processor in the system. Typically, to access that global memory, a virtual address generated during program execution must be translated into a physical address into local memory of a processing element.

Even though local memory is addressed globally, it typically remains under the control of its local processor 102. One typical memory management strategy is illustrated in FIG. 3. In FIG. 3, local memory 10 includes text segment 12, heap segment 14 and stack segment 16. Text segment 12 holds program instructions and is placed near the bottom of the local memory address space. Heap segment 14 is used to allocate memory as needed by the executing program. It is placed above text segment 12 and it grows upward. Finally, stack segment 16 resides at the top of the physical memory space and grows downward. Stack segment 16 is used to store variables in response to an exception or when entering a subroutine and to store data while in the subroutine. Free memory 18 is the unallocated memory between heap segment 14 and stack segment 16.

Heap segment 14 and stack segment 16 tend to grow and shrink as data objects are declared or released within a program. As a program declares new data objects in the main routine, heap segment 14 grows, if needed, to provide memory locations in heap segment 14 needed for the new data object. If, as segment 14 or 16 grows, the amount of free memory 18 drops to zero, a collision occurs between the segments. The user system must then perform some routine such as garbage collection to create more free memory.

The above approach works well for single processing element applications or multiple processing applications where communication between processing elements is limited to message passing. In some situations, it can be advantageous to provide a more integrated view of memory to the processing elements. Such an integrated view can be presented via, for example, a shared memory model of local memory. In such a model, the same areas of memory on different local memories are allocated to the same data object; that data object is distributed across the different local memories. What is needed is an efficient way to manage memory within the shared memory model.

SUMMARY OF THE INVENTION

To overcome limitations in the art described above and to overcome other limitations that will become apparent upon reading and understanding the present specification, the present invention provides a method of managing distributed memory in which a local memory is partitioned into a shared heap segment, a shared stack segment, a private heap segment and a private stack segment. One of the segments starts at a fixed address and grows upward. A second segment starts at a fixed address and grows downward. A third segment starts at a relocatable segment wall and grows downward and a fourth segment starts at a relocatable segment wall and grows upward.

BRIEF DESCRIPTION OF THE DRAWINGS

The foregoing and other objects, features and advantages of the invention, as well as the presently preferred embodiments thereof, will become apparent upon reading and understanding the following detailed description and accompanying drawings in which:

FIG. 3 illustrates a message passing local memory structure; and

FIGS. 4A–D illustrate some representative memory segment layouts.

DETAILED DESCRIPTION OF THE PREFERRED EMBODIMENT

In the following detailed description of the preferred embodiment, reference is made to the accompanying drawings which form a part hereof, and in which is shown by way of illustration a specific embodiment in which the invention may be practiced. It is to be understood that other embodiments may be utilized and structural changes made without departing from the scope of the present invention.

Figure 1:
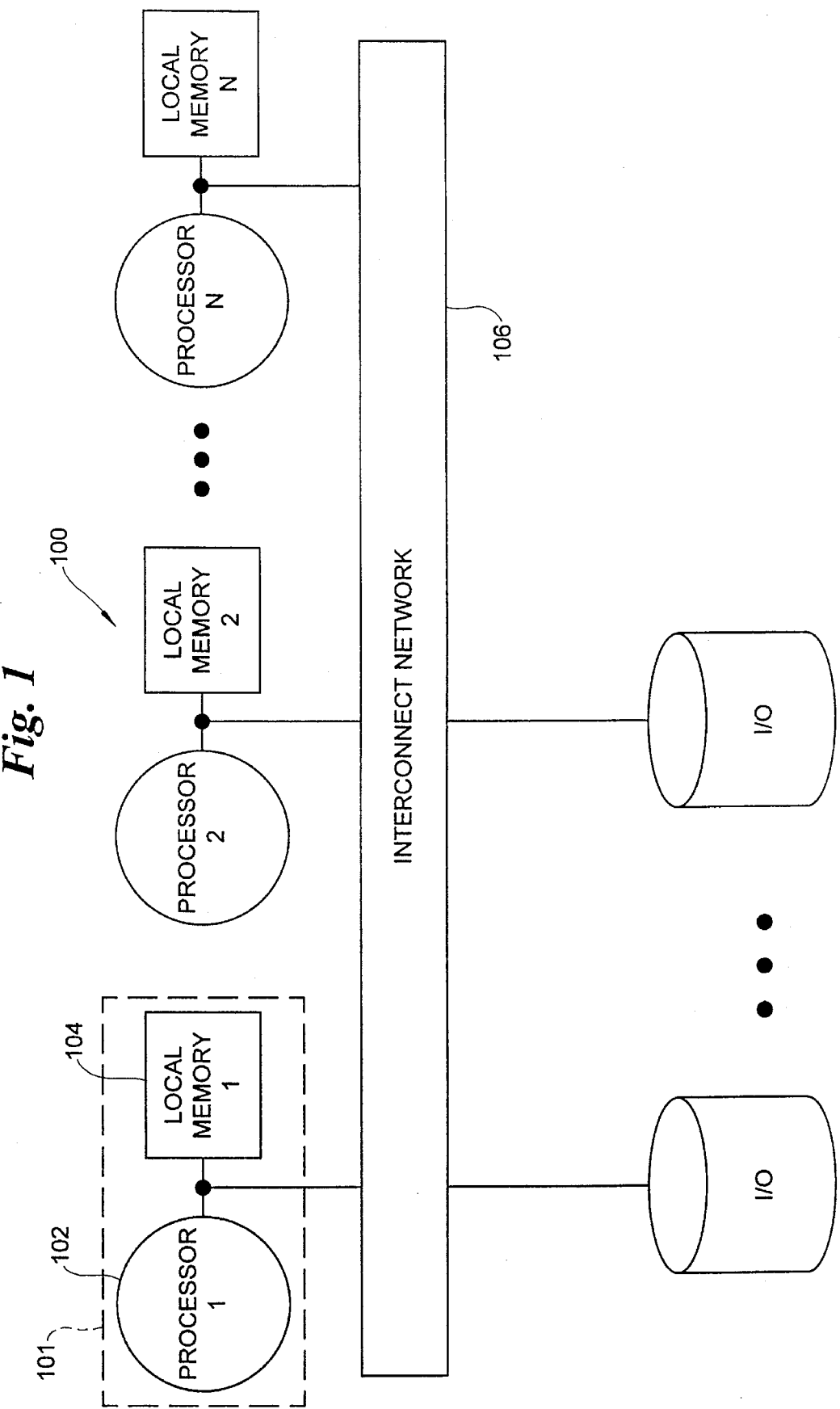
FIG. 1 shows a simplified block diagram of a massively parallel processing system in which the memory management protocol can be used.

The preferred MPP system is a MIMD massively parallel processing system with a physically distributed, globally addressable memory. A representative massively parallel processor (MPP) system 100 is shown in FIG. 1. The MPP system 100 contains hundreds or thousands of processing elements 101, wherein each processing element 101 comprise a processor 102, connected to a local memory 104 and associated support circuitry (not shown). The PE's in the MPP system 100 are linked via an interconnect network 106.

The preferred MPP system 100 has a physically distributed globally addressed memory, wherein each processor 102 has a favored, low latency, high bandwidth path to a local memory 104, and a longer latency lower bandwidth access to the memory banks 104 associated with other processors 102 over the interconnect network 106. A distributed addressing scheme for addressing globally addressed memory in the preferred MPP system 100 is described in "SYSTEM AND METHOD OF ADDRESSING DISTRIBUTED MEMORY WITHIN A MASSIVELY PARALLEL PROCESSING SYSTEM," filed Dec. 10, 1993 by Oberlin et al., which is incorporated herein by reference.

In the preferred embodiment, the interconnect network 106 is comprised of a 3-dimensional torus which, when connected, creates a 3-dimensional matrix of PEs. The torus design has several advantages, including high speed information transfers and the ability to avoid bad communication links. A toroidal interconnect network is also scalable in all three dimensions. An interconnect network of this nature is described in more detail in the copending and commonly assigned U.S. patent application Ser. No. 07/983,979, entitled "DIRECTION ORDER ROUTING IN MULTI-PROCESSING SYSTEMS", by Gregory M. Thorsen, filed Nov. 30, 1992, which is incorporated herein by reference.

Figure 2:
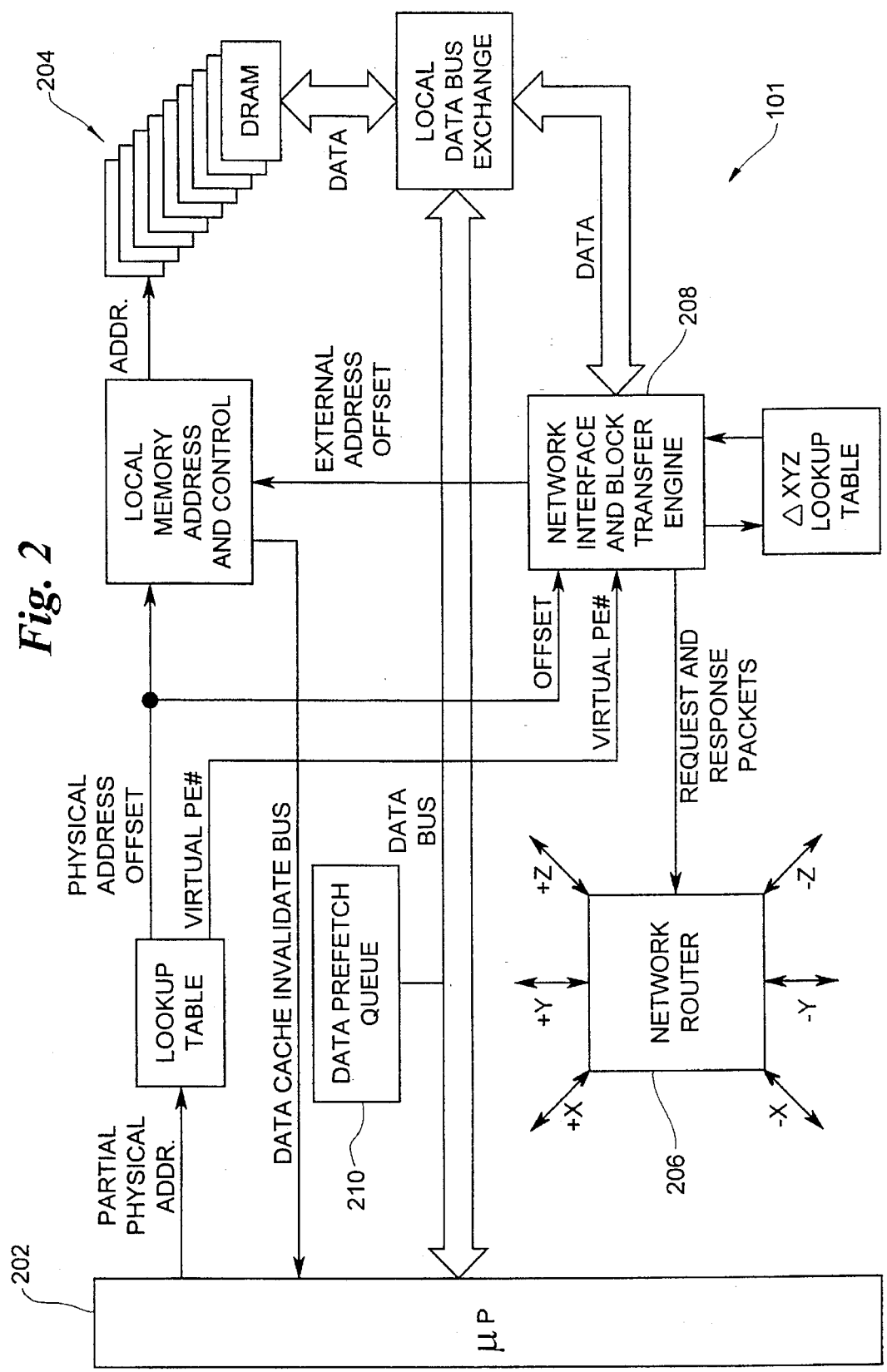
FIG. 2 shows a block diagram of a processing element (PE), including a processor, its associated shell circuitry, and local memory.

FIG. 2 shows a simplified block diagram of one embodiment of a PE 101. In such an embodiment, an individual PE 101 includes a high-performance RISC (reduced instruction set computer) microprocessor 202. In the preferred MPP system, microprocessor 202 is the DECChip 21064-AA RISC microprocessor, available from Digital Equipment Corporation. Each microprocessor 202 is coupled to a local memory 204 that is a distributed portion of the globally-addressable system memory. Each PE 101 further includes a shell of circuitry that implements synchronization and communication functions facilitating interactions between processors.

The shell circuitry includes an interconnection network router 206, used to connect multiple PEs 101 in a three-dimensional toroidal "fabric". The toroidal interconnect network carries all data communicated between PEs and memories that are not local. In the embodiment shown, an optional block transfer engine 208 in the PE shell circuitry permits asynchronous (i.e., independent of the local processor) movement of data, such as block transfers, between the local memory 204 and remote memories associated with other PEs 101, while providing flexible addressing modes that permit a high degree of control over the redistribution of data between the shared portions of the system memory. In one such embodiment, a separate hardware-implemented address centrifuge is associated with the block transfer engine 208. However, it shall be understood that the address centrifuge operation can be used to extract PE number and offset from any global address, with or without special hardware support. The implementation of the address centrifuge within in the block transfer engine is for purposes of illustration only, and is not a limitation of the present invention.

The shell circuitry also includes a data prefetch queue 210 which allows microprocessor 202 to directly initiate data movement between remote memories and the local processor in a way that can hide access latency and permit multiple remote memory references to be outstanding.

Synchronization circuits in the shell permit synchronization at various different levels of program or data granularity in order to best match the synchronization method that is "natural" for a given parallelization technique. At the finest granularity, data-level synchronization is facilitated by an atomic swap mechanism that permits the locking of data on an element-by-element basis. The atomic swap operation is described in detail in the copending and commonly assigned U.S. patent application entitled "ATOMIC UPDATE OF MEMORY," filed on Oct. 22, 1993, by Barriuso et al., which detail is incorporated herein by reference. A more coarse grain data-level synchronization primitive is provided by a messaging facility, which permits a PE to send a packet of data to another PE and cause an interrupt upon message arrival, providing for the management of message queues and low-level messaging protocol in hardware. Control-level synchronization at the program loop level is provided by a large set of globally accessible fetch-and-increment registers that can be used to dynamically distribute work (in the form of iterations of a loop, for instance) among processors at run time. Yet another form of control-level synchronization, barrier synchronization, is useful to control transitions between major program blocks (i.e., between loops performing actions on the same data sets). The barrier mechanism is described in detail in the copending and commonly assigned U.S. patent application entitled "BARRIER SYNCHRONIZATION FOR DISTRIBUTED MEMORY MASSIVELY PARALLEL PROCESSING SYSTEMS," filed Dec. 10, 1993 by Oberlin et al., which is incorporated herein by reference.

Memory Management

In one embodiment of MPP system 100, a parallel FORTRAN is implemented with a shared memory model. Such a model has been found to be useful in reducing the burden on programmers; it is much easier to write programs using shared memory than to use message passing. In the preferred MPP system 100, both shared and private data objects are supported. Such an approach tends to give the user the greatest flexibility in exploiting locality. Shared objects allow easy cooperation across processing elements while retaining some locality. Private objects allow the programmer to maximize locality at the processing element at some cost to ease of use.

In the preferred embodiment of MPP system 100, a processor 102 attempting to read a remote memory location provides a physical address into the local memory 104 on the other processing element. That is, there is no translation of virtual memory bits to physical memory locations on the remote processing element. This approach results in a system in which a processing element 101 can reference memory in a remote local memory 104 without interrupting the processor 102 associated with that local memory 104. In such embodiment, however, all shared memory must be maintained at the same predetermined locations in the local memories 104 of the processing elements 101 assigned to a particular task in order that it can be accessed by the processing elements 101 assigned to that task.

In order to maintain both shared and private data objects, in one embodiment, local memory 104 is split into at least four segments: a shared heap, a shared stack, a private heap and a private stack in local memory. In one embodiment, the segments are placed such that one end of each segment is set at a fixed address. Such an embodiment can be understood in the context of FIG. 4a. In FIG. 4a, local memory 300 comprises a text segment 302, a subsegments segment 304, a private heap segment 306, a private stack segment 308, a shared heap segment 310 and a shared stack segment 312. Private heap segment 306 is placed at a fixed address 305 above subsegment segment 304 and grows upward from fixed address 305. Private stack segment 308 is placed at a fixed address 309 and grows downward. Shared heap segment 310 is placed at fixed address 309 and grows upward. Finally, shared stack segment 312 is placed at the top of local memory and grows downward. Free memory 314 is the amount of unused memory between segments 306 and 308 while free memory 316 is the amount of unused memory between segments 310 and 312. Operating system software executing on the processor 102 associated with the remote local memory keeps track of the extents of each segment.

In one embodiment of local memory 300, each segment 306, 308, 310 and 312 is fixed at one end of the segment. This means that the amount of free memory available to each segment is limited to that free memory 314 or 316 allocated to the area between segments 306 and 308 and between 310 and 312. For example, in the embodiment of FIG. 4a described above, free memory 314 can be used only by either private heap segment 306 or private stack segment 308. In such an embodiment, when private heap 306 and private stack 308 grow into each other, there is no recourse. None of free memory 316 can be used. This can result in premature exhaustion of local memory.

In an alternate embodiment of local memory 300 in FIG. 4a, address 309 can be relocated under control of operating system software executing on processor 102 of the processing element. In such an embodiment, if free memory between two segments runs out because the two segments have grown into each other (a segment collision), the operating system relocates address 309 and moves the contents of segments 308 and 310 accordingly. This move frees up more memory between the colliding segments and execution can therefore continue. In one embodiment, processor 102 reads the contents of the memory locations to be moved, stores the contents in a register in processor 102 and then writes the contents to the relocated memory locations.

This alternate approach to local memory 300 has the advantage that both free memory 314 and 316 must run out of allocable memory locations before a collision occurs which could be terminal to the program. This approach does have one drawback. On a collision, when the shared heap is moved to begin at a new physical address, processing elements which might want to access that shared heap must wait until all shared memory has been allocated on a processing element before they access that processing element's local memory. (It is generally not safe to permit access to a shared memory location on a processing element until you know that the processing element has allocated the memory.) In addition, processing elements must synchronize even if the shared segment move is due solely to an increase in the size of one of the private segments. In one embodiment, each processing element waits for a barrier synchronization signal before it accesses another processing element's shared memory space.

Another approach to allocating shared and private memory is illustrated in FIG. 4b. In FIG. 4b, shared segments 310 and 312 have been placed at the ends of local memory 320 and private segments 306 and 308 have been grouped into the middle of local memory 320. As above, fixed address 309' can be relocated under control of operating system software executing on processor 102 of the processing element. In such an embodiment, if free memory between two segments runs out because the two segments have grown into each other (a segment collision), the operating system relocates address 309' and moves the contents of segments 306 and 308 accordingly. This move frees up more memory between the colliding segments and execution can therefore continue. In one embodiment, during the segment move, processor 102 reads the contents of the memory locations to be moved, stores the contents in a register in processor 102 and then writes the contents to the relocated memory locations.

The approach of FIG. 4b is advantageous in that it eliminates the synchronization needed when shared memory is moved due to a private memory collision. In FIG. 4b, the memory moved is strictly private segments and, therefore, under the complete control of the processor 102 on that processing element. Synchronization may still be necessary in order to coordinate the growing or shrinking of a shared segment, even if there is no segment collision as a result.

Figure 4C:
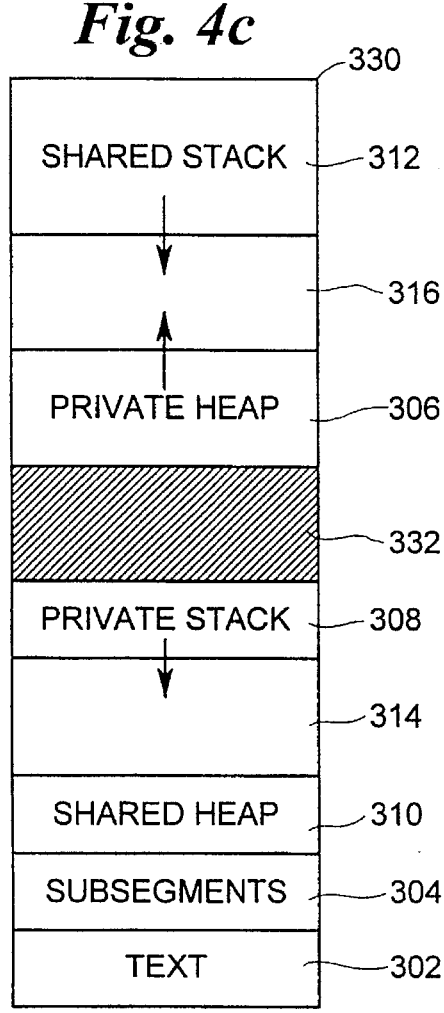

It should be apparent that one does not have to keep private segments 306 and 308 contiguous in order to profit from the approach of FIG. 4b. In FIG. 4c, a free memory area 332 in local memory 330 could be used to create some buffering between private heap segment 306 and private stack segment 308. Free memory area 332 can be used to limit the amount of moving of one private segment when a collision occurs between its neighboring private segment and a shared segment. In one embodiment, a certain amount of free memory is kept in free memory 332. In such an embodiment, an understanding of a program's behavior could be used to select an optimum free memory area 332 in order to reduce the number of times that two segments must be moved. In one embodiment, a certain amount of free memory is kept in free memory 332. As the segments begin to occupy more of the available memory, free memory 332 is reduced until it is zero. In such an embodiment, behavior will tend toward the behavior of memory 320 as free memory 332 goes to zero.

Figure 4D:
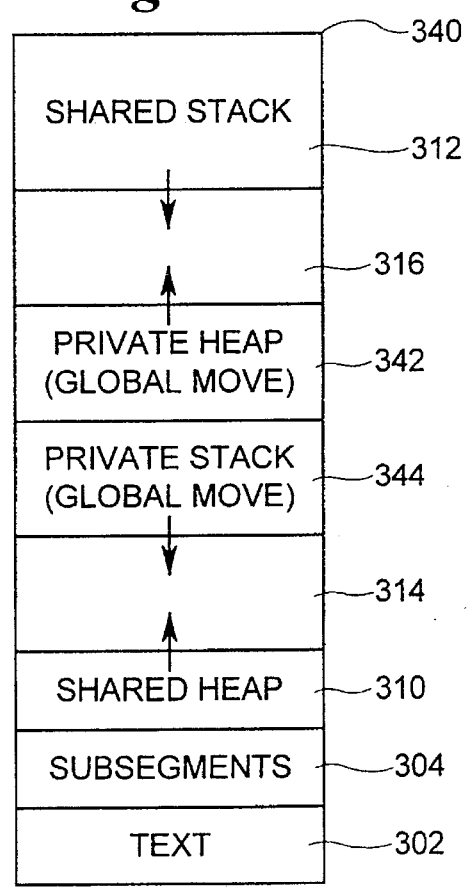

Finally, it is conceivable that one might wish to combine message passing with the shared model in a multiprocessor application. Such an embodiment is shown in FIG. 4d. In local memory 340 in FIG. 4d, private heap 342 and private stack 344 are used to store messages passed from one processing element 101 to the next. Therefore, each move of the private heap 342 and private stack 344 must be synchronized with the processing elements in order to avoid the situation where one processing element writes into another's local memory before the collision move is completed. Such synchronization can be ensured through the use of the barrier synchronization mechanism described "BARRIER SYNCHRONIZATION FOR DISTRIBUTED MEMORY MASSIVELY PARALLEL PROCESSING SYSTEMS," filed Dec. 10, 1993 by Oberlin et al.

It is clear that the memory management techniques described above provide a flexible approach to segment management which minimizes the complexity of address translation by keeping shared memory segments at known locations in memory. This application is intended to cover any adaptations or variations of the present invention and is therefore limited only by the claims or equivalents thereof.

What is claimed is:

1. In a computer system having a plurality of processing elements connected by an interconnect network, wherein the plurality of processing elements includes a first processing element and a second processing element, wherein said :first processing element includes a first processor connected to a first local memory and wherein said second processing element includes a second processor connected to a second local memory, a method of allocating memory in local memory of said first and second processing elements, the method comprising the steps of:

partitioning the first local memory into a private heap segment, a private stack segment, a shared heap segment and a shared stack segment;

partitioning the second local memory into a private heap segment, a private stack segment, a shared heap segment and a shared stack segment;

fixing one end of the first local memory's shared heap segment at a first predetermined location within said first local memory;

fixing one end of the second local memory's shared heap segment at the same first predetermined location within said second local memory;

fixing one end of the first local memory's shared stack segment at a second predetermined location within said first local memory;

fixing one end of the second local memory's shared stack segment at the same second predetermined location within said second local memory;

placing the private heap segment and the private stack segment within each of said first and said second local memories; and growing and shrinking said shared heap segments and said shared stack segments such that said first and second shared heap segments remain equal size and said first and second shared stack segments remain equal size.

2. The method according to claim 1 wherein the step of growing and shrinking includes the step of keeping the shared heap segment and the shared stack segment within a first portion of memory within each of said first and said second local memories; and wherein the step of placing the private heap segment and the private stack segment comprises the step of keeping the private heap segment and the private stack segment within a second portion of memory within each of said first and said second local memories, wherein said first and second portions of memory do not overlap.

3. The method according to claim 1 wherein the step of placing the private heap segment and the private stack segment comprises the step of locating the private heap segment and the private stack segment between the shared heap segment and the shared stack segment.

4. The method according to claim 3 wherein the step of locating includes the step of incorporating a free memory area between the private heap segment and the private stack segment on each local memory.

5. A computer system comprising:

a plurality of processing elements, wherein each processing element includes a processor and a local memory connected to processor; and an interconnection network connecting the plurality of processing elements;

wherein each local memory includes a private heap segment, a private stack segment, a shared heap segment and a shared stack segment, wherein the shared heap segment starts at a first predetermined address within each local memory and wherein the shared stack segment starts at a second predetermined address within each local memory, wherein said shared heap segment and said shared stack segment grow toward each other within each local memory, and wherein each of said shared heap segments remain equal size and wherein each of said shared stack segments remain equal size.

6. In a computer system having a plurality of processing elements connected by an interconnect network, wherein each of the plurality of processing elements includes a processor connected to a local memory and wherein the local memory is part of a globally addressable memory model wherein each of the plurality of processing elements can access local memory of another processing element by providing a physical address into the local memory of the other processing element, a method of allocating memory in local memory of each of said processing elements, the method comprising the steps of:

allocating shared memory, wherein the step of allocating shared memory includes the steps of:
allocating memory for a shared heap segment in each of said local memories,
wherein the step of allocating includes the steps of:
defining a shared heap segment size; and
fixing one end of the shared heap segment at a first predetermined physical address within each of the local memories;
allocating memory for a shared stack segment in each of said local memories,
wherein the step of allocating includes the steps of:
defining a shared stack segment size; and
fixing one end of the shared stack segment at a second predetermined physical address within each of the local memories;

allocating memory for a private heap segment in each of said local memories;

allocating memory for a private stack segment in each of said local memories;

increasing and decreasing the shared heap segment size equally on each local memory; and increasing and decreasing the shared stack segment size equally on each local memory.

* * * * *